United States Patent

Kolbe et al.

[11] Patent Number: 6,082,834
[45] Date of Patent: Jul. 4, 2000

[54] CIRCUIT ARRANGEMENT FOR A BRAKE SYSTEM WITH ANTI-LOCK CONTROL AND TRACTION SLIP CONTROL

[75] Inventors: Alexander Kolbe, Gross Zimmern; Thomas Sommer, Frankfurt am Main, both of Germany

[73] Assignee: ITT Automotive Europe GmbH, Frankfurt, Germany

[21] Appl. No.: 08/871,595

[22] Filed: Jun. 6, 1997

Related U.S. Application Data

[63] Continuation of application No. 08/406,909, filed as application No. PCT/EP93/02438, Sep. 9, 1993, abandoned.

[30] Foreign Application Priority Data

Sep. 25, 1992 [DE] Germany .............................. 42 32 132

[51] Int. Cl.$^7$ .................................................. B60T 8/60
[52] U.S. Cl. ..................................... 303/139; 303/122.08
[58] Field of Search ............................. 303/10, 11, 113.1, 303/113.2, 139, 115.4, 122.08

[56] References Cited

U.S. PATENT DOCUMENTS

| | | | |
|---|---|---|---|
| 4,755,008 | 7/1988 | Imoto et al. | 303/139 |
| 4,892,364 | 1/1990 | Burgdorf . | |
| 4,967,866 | 11/1990 | Maehara | 303/139 |
| 4,975,852 | 12/1990 | Fennel et al. . | |
| 5,000,520 | 3/1991 | Schmitt | 303/10 |
| 5,197,788 | 3/1993 | Fennel et al. . | |
| 5,454,632 | 10/1995 | Burgdorf et al. | 303/115.4 |

FOREIGN PATENT DOCUMENTS

| | | |
|---|---|---|
| 0 313 292 | 4/1989 | European Pat. Off. . |
| 0 325 291 | 7/1989 | European Pat. Off. . |
| 0 486 819 | 5/1992 | European Pat. Off. . |
| 3 241 039 | 5/1984 | Germany . |
| 3 813 172 | 11/1989 | Germany . |
| 3 813 174 | 11/1989 | Germany . |
| 3 818 260 | 12/1989 | Germany . |
| 3 836 082 | 4/1990 | Germany . |
| 3 932 567 | 4/1991 | Germany . |
| 4 015 866 | 11/1991 | Germany . |
| 4 020 449 | 1/1992 | Germany . |
| 4 032 876 | 4/1992 | Germany . |
| 4 037 142 | 5/1992 | Germany . |
| 4 110 494 | 10/1992 | Germany . |
| 5185928 | 7/1993 | Japan ................................. 303/116.4 |

Primary Examiner—Matthew C. Graham
Attorney, Agent, or Firm—Ratner & Prestia

[57] ABSTRACT

A circuit arrangement for a brake system having anti-lock control (ABS) and traction slip control by brake management (BASR) which has an electromotively driven hydraulic pump for the auxiliary pressure supply in the ABS mode and BASR mode, sensors to determine the wheel rotational behavior, and an electronic circuit for analyzing the sensor signals and generating braking pressure control signals. The hydraulic pump, in the BASR mode, is activated by a pulse train (at least temporarily), and the flow rate of the pump is adjusted to the requirements by modulating the pulse train, the requirements being determined by analyzing the traction slip and the instantaneous rotational speed of the hydraulic pump. Pulse patterns in the form of pulse trains with predetermined pulse times and times of pulse break serve to activate the pump.

19 Claims, 4 Drawing Sheets

CIRCUIT ARRANGEMENT FOR A BRAKE SYSTEM WITH ANTI-LOCK CONTROL AND TRACTION SLIP CONTROL

This application is the U.S. national-phase application of PCT International Application No. PCT/EP93/02438.

This application is a continuation of application Ser. No. 08/406,909 filed Mar. 27, 1995 now abandoned.

BACKGROUND OF THE INVENTION

The present invention relates to a circuit arrangement for a hydraulic brake system including anti-lock control (ABS) and traction slip control by brake management (BASR), an electromotively driven hydraulic pump for the auxiliary pressure supply in the ABS mode and BASR mode, sensors to determine the wheel rotational behavior, and an electronic circuit for analyzing the sensor signals and generating braking pressure control signals and auxiliary pressure control signals.

Prior-art hydraulic brake systems of this type have a hydraulic pump which supplies both the auxiliary pressure required during anti-lock control (in the "ABS model") and the braking pressure for the brake actuation during traction slip control (in the "BASR model"). The hydraulic pump can have a one-circuit or multiple-circuit design and is driven by an electric motor. This motor is switched on when the control commences. The hydraulic energy requirements vary widely depending on the control operation and the control phase. Of course, the nominal capacity of the motor-and-pump assembly is dictated by the maximum requirements which may occur in certain, rare situations. Compared to an anti-lock control operation, principally, a substantially lower amount of hydraulic pressure and a correspondingly lower amount of energy is required for traction slip control by brake management (BASR) when the pump must supply the pressure for the actuation of the brake. Although a less potent motor-and-pump assembly would be sufficient for traction slip control, for cost reasons, the same assembly is used for ABS and BASR operations.

Noises which develop upon the commencement of the control and are caused by the activation and the operation of the hydraulic pump are felt as a disturbance, in particular, during a traction slip control operation. Frequently, other noises are superimposed during the anti-lock operation, so that the pump noises are less significant. Also, it is known to minimize disturbing noises by reducing the rotational speed of the pump or the motor of the pump, which is proportional to the flow rate of the pump (DE 40 32 876 A1). Therefore, attempts have been made to reduce the flow rate of the pump in the BASR operation, when principally a reduced flow rate compared to the ABS operation is required, by inserting a series resistance into the activation path of the engine pump (DE 41 10 494 A1). However, in this event, too, the flow rate of the pump is dictated by the maximum output required in the BASR operation. In most situations, the flow rate and, thus, the development of noises continue to be considerably greater than necessary. Hence, a better adjustment to the actual flow rate requirements is desirable.

SUMMARY OF THE INVENTION

Therefore, it is an object of the present invention to limit the flow rate of the pump during BASR operation to the value which is actually required in the prevailing situation, in a simple manner, incurring little expenditure, but not at the cost of safety. This way, the development of disturbing noise is to be minimized. A limitation to the actual requirements is advantageous also in respect of wear and useful life of the pump. However, it is of course imperative to avoid curtailing the operational reliability or the efficiency of traction slip control by brake management.

It has been discovered that this object may be achieved by the circuit arrangement of the present invention. The special features of the circuit arrangement of the present invention are that the hydraulic pump, in the BASR mode, is activated by a pulse train at least temporarily (there is a permanent activation in the beginning and in certain situations), that the flow rate of the pump is adjusted to the requirements in the respective situation and under the prevailing conditions by modulation of the pulse train, and that the requirements are determined by analyzing the traction slip of the driven wheels and the instantaneous rotational speed of the hydraulic pump. Expediently, the exceeding of predetermined traction slip thresholds is determined and analyzed as a standard of the required flow rate of the pump. The wheel slip data are required for the ABS control and BASR control anyway, so that this type of determination of requirements may be achieved without additional effort or, at the most, with little additional effort.

To activate the pump motor, according to a favorable aspect of the present invention, several pulse patterns are formed by pulse trains with predetermined pulse times and times of pulse break, and the pump motor is activated by a determined pulse pattern in response to the actual requirements found or the exceeding of threshold values of slip and rotational pump motor speed. As an alternative, a continuous variation of the pulse times and times of pulse break of the activation pulse train in response to the measured values may be used, as far as this is advantageous for special cases of application for particular reasons.

According to another aspect of the present invention, the traction slip is determined by comparing the speed of the driven wheels with the vehicle speed or a vehicle reference speed, and is compared individually for each wheel with two predetermined slip thresholds. These slip thresholds and a threshold value of the rotational motor speed serve to determine the respective pulse pattern for the pump activation, and the exceeding of the slip thresholds and the attaining of the rotational speed threshold are analyzed in response to the pump activation.

According to still another aspect of the present invention, the reaction of the rotational speed of the pump motor to the pump activation or to a variation of the pulse pattern of the pump activation is determined and analyzed to adjust the pulse pattern to the respective requirements and/or for monitoring and error detection. For example, if the rotational speed of the pump motor stays below the rotational speed threshold value in spite of activation of the pump by a pattern which results in a relatively high flow rate or even a permanent switch-on of the pump, an error is indicated. Expediently, the presence of an error is then signalled and the control is deactivated.

Further features, advantages and possible applications of the present invention can be seen in the following description of other details with reference to the accompanying drawings.

DETAILED DESCRIPTION OF THE INVENTION

Figure 1:
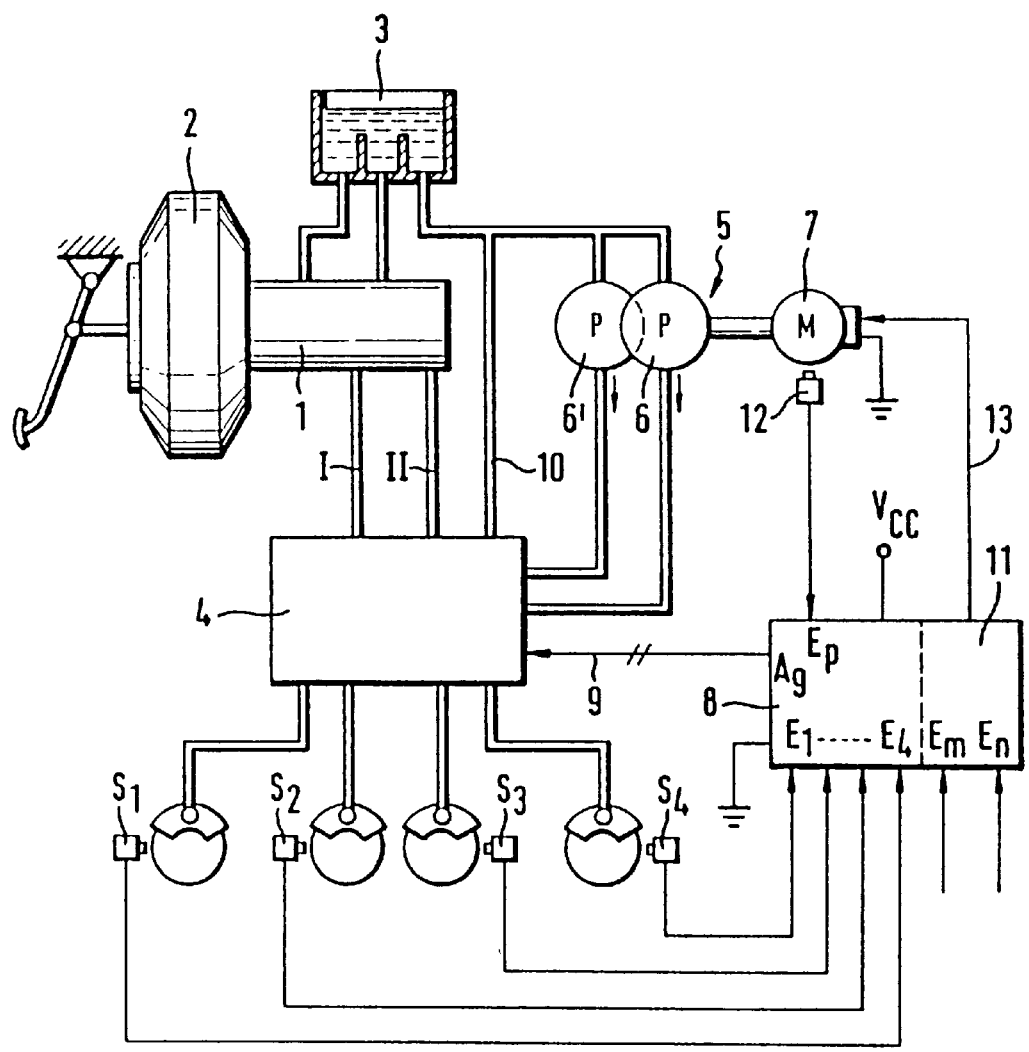
FIG. 1 is a schematic drawing of the most important components of a brake system including anti-lock control and traction slip control.

The brake system of FIG. 1 is substantially composed of a tandem master cylinder 1 with a brake power booster 2 connected upstream of the tandem master cylinder, a pressure compensating and supply reservoir 3 and a pressure modulator 4. Further, a motor-and-pump assembly 5 including a hydraulic pump 6 and an electric drive motor 7 are provided for the generation of auxiliary pressure. The master cylinder 1 has two hydraulically isolated brake circuits I, II, to which, expediently, the wheel brakes are connected in a diagonal arrangement or a black/white arrangement via hydraulic valves (not shown). A motor-and-pump assembly 5, including a dual-circuit hydraulic pump 6, 6' and a joint electric drive motor 7 is provided for the auxiliary pressure supply. The hydraulic isolation of the brake circuits I, II also is maintained during the auxiliary pressure supply. The pump 6 is associated with the brake circuit I, while the pump 6' is associated with the brake circuit II.

The illustrated embodiment of the present invention shows a so-called "open-center" system, in which the pressure fluid, which is discharged from the wheel brakes in the pressure reduction mode, flows, through a return line 10, back to the reservoir 3 of the brake system, to which the suction sides of the pumps 6, 6' also are connected. In a "closed-loop" system, to which the invention is applicable as well, the pressure fluid discharged from the wheel brakes is returned by the hydraulic pumps directly into the associated brake circuit or into the master cylinder of the brake system. Many types of brake systems with open-center and closed-loop hydraulic systems are known, so that there is no need to go into particulars.

The brake system of FIG. 1 includes an electronic controller 8, the main purpose of which is to analyze the data about the rotational pattern of the individual vehicle wheels, which have been gathered by means of wheel sensors $S_1$ to $S_4$, and to generate braking pressure control signals. The braking pressure control signals are directed to the braking pressure modulator 4 through an output $A_9$. A multiple line 9 is represented in FIG. 1, through which wheel valves, i.e. inlet and outlet valves, incorporated in the modulator 4, may be operated. Generally, electromagnetically operable multiway valves are used which, depending on the control mode, keep the braking pressure in the wheel brakes constant, or reduce and re-increase the braking pressure. In the BASR mode, the solenoid valves first cause closure of the pressure fluid conduit from the wheel brakes to the master cylinder 1, while the required braking pressure then is built up, by means of the hydraulic pumps 6, 6', and supplied to the driven wheels through the solenoid valves of the pressure modulator 4. The traction slip is controlled by means of the inlet and outlet valves which also serve for the anti-lock control operation.

$V_{cc}$ represents the connection of the controller 8 and, through the controller, the pump motor 7 to the electric power supply. The components of the circuit arrangement according to the present invention, which serve to activate the pump motor 7 and to adjust the flow rate of the pump, as a component of the controller 8, are comprised in a unit 11, represented in dotted lines. A rotational speed sensor 12 signals the controller 8 through its input $E_p$ the rotational behavior of the pump motor 7. According to a favorable embodiment of the present invention, the information whether the rotational pump speed is above or below a predetermined rotational speed threshold value is sufficient.

The inputs $E_m$, $E_n$ are provided to connect further sensors, monitoring devices, or the like, which also influence the activation of the pump motor 7. For example, a battery voltage monitoring means may be connected to the input $E_m$ to switch on the motor 7 permanently for safety reasons, at a relatively low battery voltage.

Figure 2:
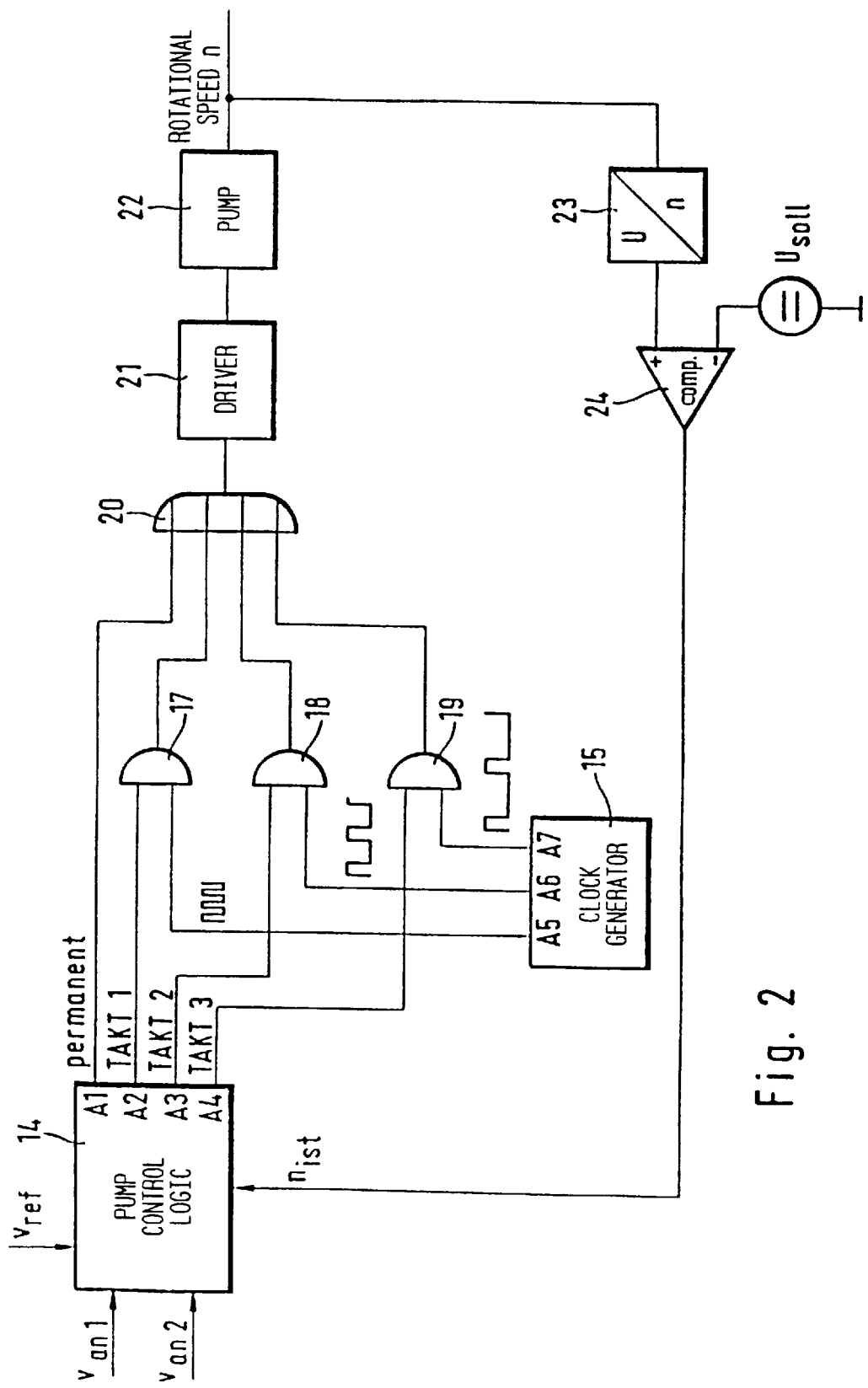
FIG. 2 is a block diagram of a preferred embodiment of the present invention.

FIG. 2 serves to understand the basic principle of the circuit arrangement according to the present invention. In a pump control logic 14, which may be provided by a hard-wired circuitry or a programmed circuit, such as a microcomputer, pulse patterns are produced in response to the traction slip and rotational pump speed. The traction slip is determined individually for each wheel by comparing the speed of a driven wheel $v_{an1}$, $v_{an2}$ with the vehicle speed or the vehicle reference speed $v_{ref}$. Through another input $n_{ist}$, the logic 14 is furnished with the information about whether the rotational speed of the pump is above or below the predetermined threshold value. If necessary, it is of course possible to define a plurality of threshold values of the rotational pump speed.

In dependence on these input variables, the logic 14 issues pump activation signals through its outputs A1 to A4. Output A1 serves to switch on the pump permanently, for example, at the commencement of the BASR mode. The outputs A2 to A4 deliver specific control signals for predetermined pulse patterns with different ratios of pulse times and times of pulse break.

In FIG. 2, the different pulse patterns are designated as "TAKT1, TAKT2, TAKT3," while the permanent switch-on signal is designated as "permanent". For the formation of the pulse patterns, a clock generator 15 is provided, at the outputs A5, A6, A7 of which the predetermined pulse patterns or trains of pulse times and times of pulse break are available. Via AND gates 17 to 19 and an OR gate 20, a driver 21 and, finally, a hydraulic pump 22 is activated. The reference numeral 22 designates the motor 7 of the motor-and-pump assembly 5 in the embodiment of FIG. 1. The rotational speed of the pump 22 or a corresponding threshold value signal is delivered to a converter 23 which compares a speed-proportional signal in a comparator 24 with a predetermined nominal value $U_{soll}$, such as a determined voltage, in this embodiment. Finally, the output of the comparator 24 is returned to the pump control logic 14, i.e. to its input $n_{ist}$.

Figure 3:
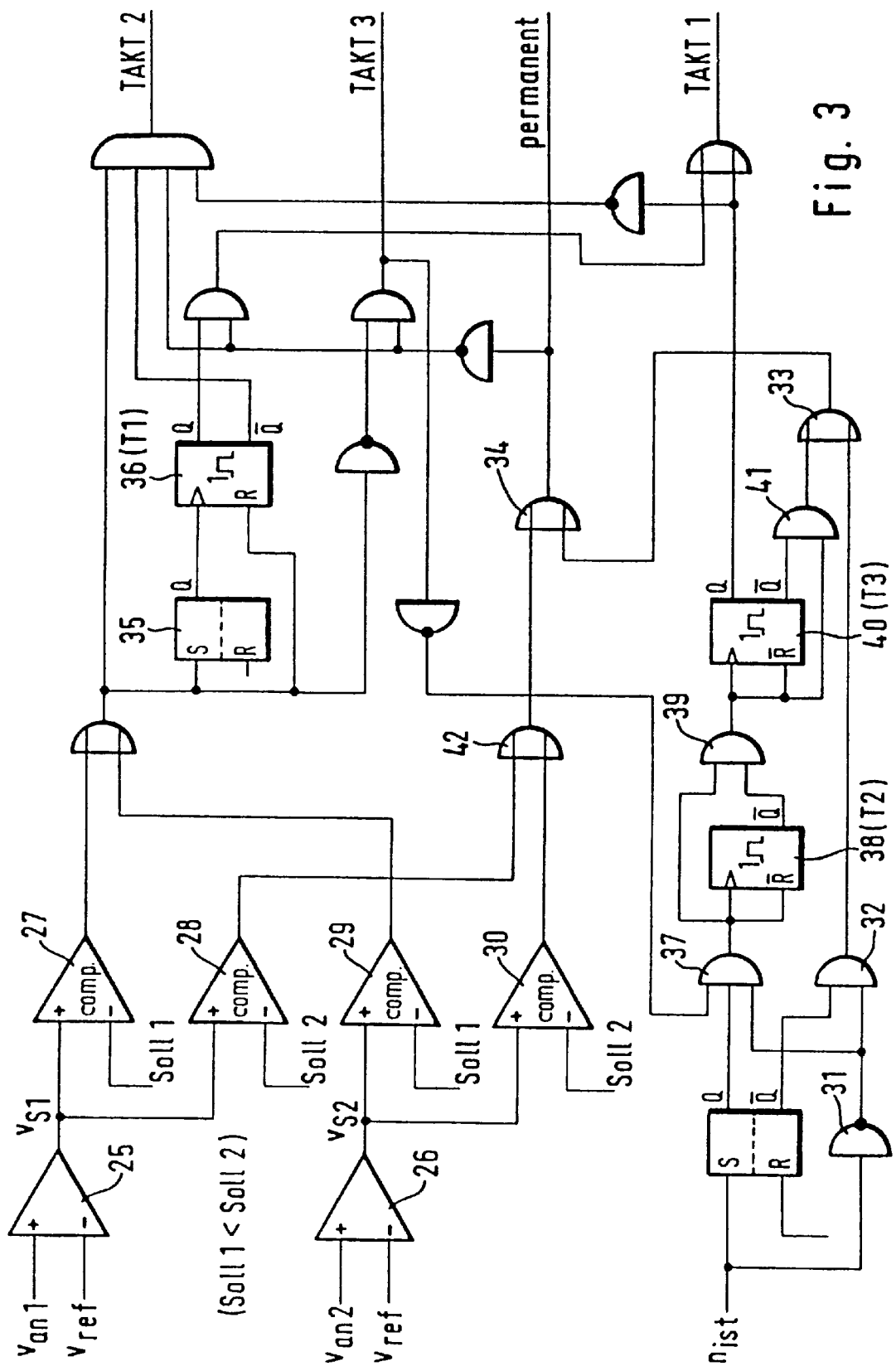
FIG. 3 is a a block diagram showing additional details of a circuit arrangement according to the present invention in the same representation as in FIG. 2.

FIG. 3 describes the inside structure of an embodiment of the pump control logic 14, herein configured as a hard-wired circuit. For the pump control, two slip thresholds Soll1, Soll2 and a signal are predetermined as information about the rotational pump speed threshold nist in this embodiment.

First, the traction slip of the driven wheels $v_{S1}$, $v_{S2}$ is determined individually for each wheel by means of comparators 25, 26. Subsequently, the slip is compared with the predetermined threshold values Soll1, Soll2 in further comparators 27 to 30, the slip threshold Soll2 representing a higher traction slip compared to Soll1.

Apart from the comparators and the logic elements, the pump control logic in FIG. 3 includes some bistable and monostable circuits which determine a defined time pattern in the pump activation. The following logic combinations and time specifications can be taken from FIG. 3 in detail:

At the commencement of a BASR mode, as long as the rotational pump speed has not yet reached the predetermined threshold value (i.e. $n_{ist}$=0), the hydraulic pump is "permanently" activated. In this case, the pump is activated without interruption by a converter 31, an AND gate 32, an OR gate 33 and an OR gate 34.

The permanent activation is maintained until the rotational speed threshold is reached and, consequently, $n_{ist}$=1.

If the slip at one or at both of the driven wheels, i.e. $v_{S1}$ and/or $v_{S2}$, is above the slip threshold Soll1, but, below the slip threshold Soll2, and if this condition applies for the first time, the pump is activated by way of a pulse pattern TAKT1 by activation of the monostable stage 36, via the bistable stage 35, for a predetermined interval T1 which may be in the order of 400 to 800 milliseconds (in this case, T1 was chosen to be 600 milliseconds). In this pulse pattern, the pulse times, or on-times, and the times of pulse break are equally long. 14 milliseconds were chosen for the pulse time and for the time of pulse break in one embodiment. When the rotational speed drops below the threshold value after the pump was activated by TAKT1, so that $n_{ist}$=0 again, the system switches back to permanent activation (permanent) upon lapse of a predetermined interval T2+T3 (for example, T2+T3=800 milliseconds). The permanent activation is continued until the rotational speed threshold value is exceeded again. In this case, the waiting time T2+T3 is reached by the activation of the two monostable stages 38 (T2) and 40 (T3) through AND gates 37, 39 and 41 and through OR gates 33 and 34.

Upon lapse of the waiting time T1 (for example T1=600 milliseconds), the pump is activated by the pulse pattern TAKT2, if the slip $v_{S1}$, $v_{S2}$ is above the lower slip threshold value Soll1 on at least one wheel. In this mode, the ratio between pulse break and pulse duration is approximately 2:1; as a result, the pump flow rate is reduced. If the rotational pump speed drops below the threshold value for an interval which exceeds T2 (for example, T2=400 milliseconds), the activation of the pump is switched back to the pulse pattern TAKT1. If the rotational speed for T3 (for example, T3=400 milliseconds) remains below the threshold, the pump will be activated without interruption until the rotational speed threshold is exceeded ($n_{ist}$=1). The pump flow rate is reduced further by switching the activation to the pulse pattern TAKT3, if the traction slip of both wheels drops below the lower threshold value Soll1.

As soon as the traction slip $v_{S1}$, $v_{S2}$ of one of the two wheels rises above the upper threshold value Soll2, principally, the pump is switched to permanent operation (permanent) through the OR gates 42 and 34. Further, it may still be seen in the pump control logic that the pump is switched on at its maximum output (permanent) whenever the rotational pump speed is below the threshold value ($n_{ist}$=0) and the waiting intervals T2 and T3 predetermined by the monostable time elements 38 and 40 have lapsed. Simultaneously, a monitoring operation (not shown) is started which disconnects the control after another waiting interval of 200 milliseconds, for example, if the pump rotational speed threshold ($n_{ist}$=1) was not reached within this waiting interval. In the last mentioned case, a defect in the activation of the pump is assumed.

The pulse pattern TAKT3 comprises on-times (pulse times) of 28 milliseconds and times of pulse break of four times the pulse times (112 milliseconds).

Figure 4A:
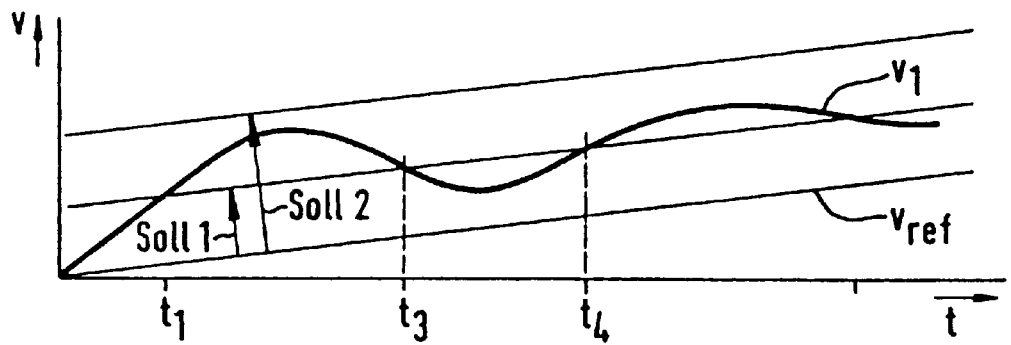
FIG. 4 is a series of characteristic curves used to explain the present invention.
Figure 4B:
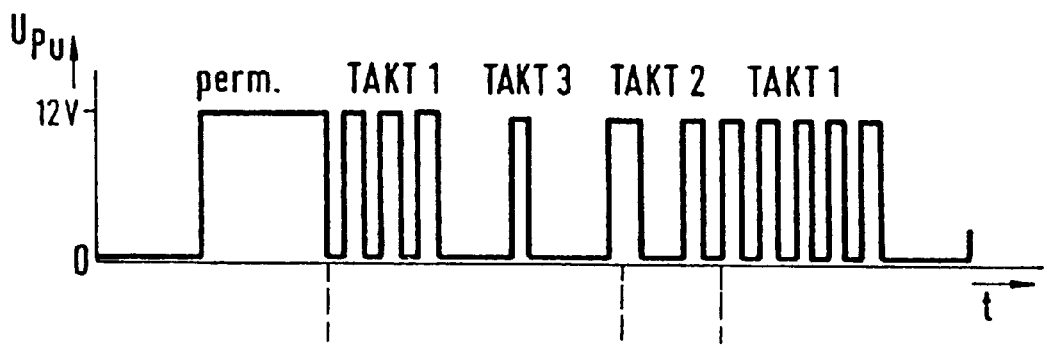
Figure 4C:
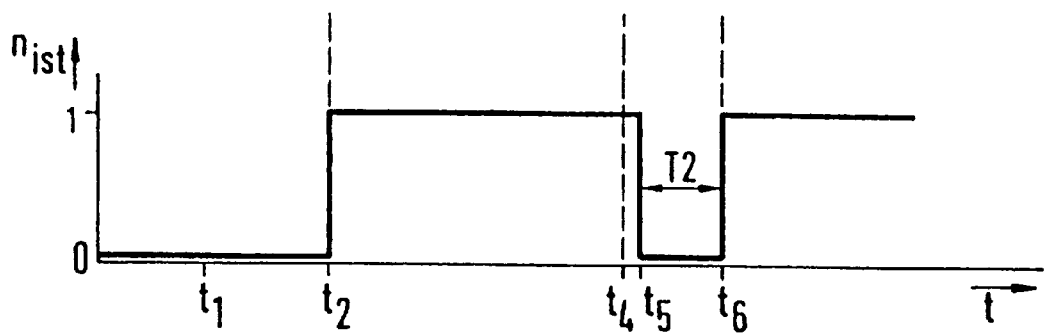

FIG. 4 illustrates the operation of the circuit arrangement according to the present invention. Curve (A) represents the speed $v_1$ of a driven wheel (namely $v_{an1}$ or $v_{an2}$) during a start-up operation and the vehicle reference speed $v_{ref}$ which serves as a reference value for the slip control. Further, two traction slip thresholds Soll1 and Soll2 are configured as lines in parallel to the reference speed $v_{ref}$.

Curves (B) and (C) show the pulse patterns "permanent", TAKT1, TAKT2, TAKT3, which are dependent on the slip and the rotational speed of the pump motor, and the detection of the rotational speed thresholds as a function of time.

The curves according to FIG. 4 are based on the following start-up operation:

The observed wheel, i.e. the faster wheel of the two driven wheels of a vehicle ($v_{an1}$ or $v_{an2}$), exceeds the lower slip threshold Soll1 at the time $t_1$. The traction slip control by brake management (BASR) commences. The auxiliary pressure supply is switched on. However, at first, the rotational speed of the pump is still below the rotational speed threshold. $N_{ist}$=0 applies. Thus, the pump is activated by a permanent signal (permanent). The pump reaches the rotational speed threshold ($n_{ist}$=1) at the time $t_2$ so that now pulse pattern TAKT1 becomes effective. Falling below the slip threshold Soll1 results in change-over of the pulse pattern to TAKT3 at the time $t_3$. The renewed rise of the traction slip in excess of the threshold value Soll1 at time $t_4$ results in change-over to the pulse pattern TAKT2 as long as the rotational speed threshold of the pump is still exceeded. Because TAKT2 or the corresponding on-times of the pump are not sufficient to maintain a rotational speed above the threshold ($n_{ist}$) and the rotational pump speed drops below the threshold value ($n_{ist}$) at the time $t_5$, again the switch-on time of the pump, compared to the times of pulse break, is increased at time $t_6$. This is done by switching back to TAKT1, however, only after lapse of a predetermined deceleration time T2 of, for example, 400 milliseconds, etc. This way, the pump flowrate is exactly adjusted to the actual requirements.

We claim:

1. A circuit arrangement for a hydraulic brake system including; anti-lock control and traction slip control by brake management; an electromotively driven hydraulic pump which operates in: (1) a first mode of operation for auxiliary pressure supply during anti-lock control; and (2) a second mode of operation for supplying braking pressure during traction slip control by brake management, wherein a lower amount of hydraulic pressure is needed during said second mode of operation than during said first mode of operation; sensors to determine the wheel rotational behavior; and an electronic circuit for analyzing the sensor signals and generating braking pressure control signals and auxiliary pressure control signals, wherein the hydraulic pump, in said second mode of operation during traction slip control by brake management, is activated by a pulse train at least temporarily, and the flow rate of the pump is adjusted by modulation of the pulse train and limited to a value at which said lower amount of hydraulic pressure is met, wherein said flow rate is determined by analyzing the combination of (1) the traction slip of the driven wheels and (2) the instantaneous rotational speed of the hydraulic pump, whereby noise developed from the pump is minimized.

2. A circuit arrangement as claimed in claim 1, characterized in that the exceeding of predetermined traction slip thresholds is discovered and analyzed as a standard of the required pump flow rate.

3. A circuit arrangement as claimed in claim 1, characterized in that the exceeding of predetermined traction slip threshold values and one or more predetermined threshold values of the rotational pump speed is analyzed as a standard of the required pump flow rate and for adjusting the activation pulse train.

4. A circuit arrangement as claimed in claim 3, characterized in that at least one of the ratio of pulse times and times of pulse break and the frequency of the activation pulse train is adjusted in response to predetermined threshold values of slip and rotational motor speed.

5. A circuit arrangement as claimed in claim 4, characterized in that several pulse patterns are formed by pulse trains with predetermined pulse times and ties of pulse break, and in that the pump motor is activated by a predetermined pulse pattern in response to at least one of: (1) the combination of the traction slip of the driven wheels and the instantaneous rotational speed of the hydraulic pump; or (2) the exceeding or falling short of the threshold values of traction slip and rotational motor speed.

6. A circuit arrangement as claimed in claim 5, characterized in that the traction slip is determined by comparing the speed of the driven wheels with the vehicle speed or the vehicle reference speed and is compared individually for each wheel with two predetermined traction slip threshold values, and in that these traction slip threshold values and a threshold value of the rotational motor speed serve to determine the respective pulse pattern for the pump activation, while at least one of the exceeding and falling short of the slip threshold values and the attaining of the rotational speed threshold value is analyzed in response to the pump activation.

7. A circuit arrangement as claimed in claim 1, characterized in that the reaction of the rotational speed of the pump motor to the pump activation or to the variation of the pulse pattern of the activation is determined and analyzed to adjust the activation pulse pattern to at least one of the requirements and for monitoring and error detection.

8. A circuit arrangement as claimed in claim 7, characterized in that the reaction of the rotational speed of the pump motor to the pump activation after predetermined intervals is determined and analyzed.

9. A circuit arrangement according to claim 1, wherein analyzing the instantaneous rotational speed of the hydraulic pump includes determining whether said instantaneous speed is above or below a predetermined threshold.

10. A circuit arrangement for a hydraulic brake system of a vehicle having anti-lock control and traction slip control by brake management, said circuit arrangement comprising:
means for developing indications of the rotation behavior of the wheels of a vehicle having driven wheels;
an electromotively driven hydraulic pump which operates in: (1) a first mode of operation for supplying auxiliary pressure during anti-lock control; and (2) a second mode of operation for supplying braking pressure during traction slip control by brake management of the vehicle, wherein a lower amount of hydraulic pressure is needed during said second mode of operation than during said first mode of operation; and
electronic circuit means for:
  (a) analyzing the wheel rotation behavior indications, and
  (b) developing braking pressure controls and auxiliary pressure controls;
said electronic circuit means including:
  (a) means for determining the traction slip of the driven wheels of the vehicle and the instantaneous rotational speed of said hydraulic pump;
  (b) a source of timing signals for regulating activation of said hydraulic pump; and
  (c) means for:
    (1) analyzing the traction slip of the driven wheels and the instantaneous rotational speed of said hydraulic pump; and
    (2) selecting, in response to analyzing the combination of: (a) the analysis of the traction slip of the driven wheels and (b) the instantaneous rotational speed of said hydraulic pump, timing signals to at least temporarily activate said hydraulic pump in said second mode of operation during traction slip control by brake management to limit the flow rate of said hydraulic pump to a value at which said lower amount of hydraulic pressure is met, whereby noise developed from said hydraulic pump is minimized.

11. A circuit arrangement according to claim 10 wherein said electronic circuit means determine when the traction slip of the driven wheels exceeds predetermined traction slip thresholds.

12. A circuit arrangement according to claim 10 wherein said electronic circuit means:
  (a) determine when the traction slip of the driven wheels exceeds predetermined traction slip thresholds, and
  (b) develop a standard of the required pump flow rate and select the timing signals in response to:
    (1) the determination that the traction slip of the driven wheels exceeds predetermined traction slip thresholds, and
    (2) at least one predetermined threshold of the rotational pump speed.

13. A circuit arrangement according to claim 10 wherein the timing signals have variable on times and off times and the ratio of the on time of the timing signals to the off time of the timing signals is selected in response to predetermined thresholds of the traction slip and the rotational speed of said hydraulic pump.

14. A circuit arrangement according to claim 10 wherein the selected timing signals are a timing pattern selected from a plurality of timing patterns having different on times and off times, the selected timing pattern chosen in response to the actual requirements.

15. A circuit arrangement according to claim 14 wherein:
  (a) the traction slip is determined by comparing the speed of the driven wheels with at least one of the vehicle speed and the vehicle reference speed; and
  (b) the traction slip is compared individually for each wheel with two predetermined traction slip thresholds;
  (c) the traction slip thresholds and a threshold of the rotational motor speed serve to select the timing pattern for activation of said hydraulic pump; and
  (d) exceeding and falling short of the slip thresholds and attaining the threshold of the rotational speed of said hydraulic pump is analyzed in response to activation of said hydraulic pump.

16. A circuit arrangement according to claim 10 wherein said electronic circuit means determine and analyze the reaction of the rotational speed of said hydraulic pump to at least one of:
  (a) activation of said hydraulic pump, and
  (b) variation of the timing pattern activating said hydraulic pump
to adjust the selected timing pattern.

17. A circuit arrangement according to claim 16 wherein the reaction of the rotational speed of said hydraulic pump to activation of said hydraulic pump is determined and analyzed after predetermined intervals.

18. A circuit arrangement according to claim 10, wherein the means for analyzing the instantaneous rotational speed of the hydraulic pump include means for determining whether said instantaneous speed is above or below a predetermined threshold.

19. A circuit arrangement for a hydraulic brake system of a vehicle having anti-lock control and traction slip control by brake management, said circuit arrangement comprising:

means for developing indications of the rotation behavior of the wheels of a vehicle having driven wheels;

an electromotively driven hydraulic pump which operates in: (1) a first mode of operation for supplying auxiliary pressure during anti-lock control; and (2) a second mode of operation for supplying braking pressure during traction slip control by brake management of the vehicle, wherein a lower amount of hydraulic pressure is needed during said second mode of operation than during said first mode of operation; and electronic circuit means for:
  (a) analyzing the wheel rotation behavior indications, and
  (b) developing braking pressure controls and auxiliary pressure controls;

said electronic circuit means including:
  (a) means for determining the traction slip of the driven wheels of the vehicle, including means for determining whether said traction slip is above or below a traction slip threshold, and means for determining the instantaneous rotational speed of said hydraulic pump, including means for determining whether said instantaneous speed is above or below a pump speed threshold,
  (b) a source of timing signals for regulating activation of said hydraulic pump; and
  (c) means for:
    (1) analyzing the traction slip of the driven wheels and the instantaneous rotational speed of said hydraulic pump; and
    (2) selecting, in response to analyzing the combination of: (a) the analysis of the traction slip of the driven wheels and (b) the instantaneous rotational speed of said hydraulic pump, timing signals to at least temporarily activate said hydraulic pump in said second mode of operation during traction slip control by brake management to limit the flow rate of said hydraulic pump to a value at which said lower amount of hydraulic pressure is met, whereby noise developed from said hydraulic pump is minimized.

* * * * *